United States Patent [19]

Nagano

[11] Patent Number: 5,067,168

[45] Date of Patent: Nov. 19, 1991

[54] READER FOR ORIGINAL DOCUMENTS AND METHOD

[75] Inventor: Fumikazu Nagano, Yamatokoriyama, Japan

[73] Assignee: Sharp Kabushiki Kaisha, Osaka, Japan

[21] Appl. No.: 520,888

[22] Filed: May 9, 1990

[30] Foreign Application Priority Data

May 16, 1989 [JP] Japan ............... 1-122542

[51] Int. Cl.⁵ .................................. G06K 9/38
[52] U.S. Cl. ...................................... 382/53
[58] Field of Search ............... 382/53, 50, 52; 358/464, 475, 461, 213.19, 228

[56] References Cited

U.S. PATENT DOCUMENTS

| | | | |
|---|---|---|---|
| 4,620,236 | 10/1986 | Tanaka et al. | 358/475 |
| 4,634,885 | 1/1987 | Inoue et al. | 358/213.19 |
| 4,835,615 | 1/1987 | Taniguchi et al. | 358/213.19 |
| 4,876,605 | 10/1989 | Ishikawa et al. | 382/53 |

FOREIGN PATENT DOCUMENTS 55-13414 1/1980 Japan.
63-10282 1/1988 Japan.

Primary Examiner—Stephen Brinich

[57] ABSTRACT

A reader for reading light reflected from or transmitted through an original document includes an adjustment apparatus for detecting the white level of an analog signal from the original document. The detection is performed before reading of the original document. The detection level is compared to a reference white level. In response to the comparison either clock signals to an image sensor or a lighting signals to a light source are varied so that any analog signal from a read document has the reference white level.

14 Claims, 6 Drawing Sheets

READER FOR ORIGINAL DOCUMENTS AND METHOD

BACKGROUND OF THE INVENTION

The present invention relates to a reader which reads reflected light or transmitted light from an original document by using a solid image sensor so as to convert its read signal into a digital image signal.

Conventionally, such a reader of this kind as shown in, for example, FIG. 1 is known. In the known reader, an original document 23 is placed face down on a glass plate 21 having a white portion 28 formed at one distal end thereof. While the glass plate 21 is being displaced by a pulse motor 10, light emitted from a white fluorescent lamp 3 and reflected at the white portion 28 is reflected by a mirror 26 and is condensed by a lens 27 so as to be received by a linear CCD (charge coupled device) sensor 4. In the CCD sensor 4a, quantity of light is converted into an electric signal and the electric signal to be outputted is adjusted to a predetermined level. Subsequently, reflected light from the original document 23 is likewise subjected to photoelectric conversion by the CCD sensor 4 sequentially such that an analog image signal is obtained.

As shown in FIG. 2, the CCD sensor 4 includes a sensor portion 31 having n CCDs Sl to Sn on the assumption that character n denotes a natural number. Photoelectric charge corresponding to quantity of light is stored in each of the CCDs Sl to Sn. The stored photoelectric charge is transferred, through a transfer gate 32 receiving a transfer pulse $\phi t$, to an analog shift register unit 33 having n shift registers SR1 to SRn and then, is sequentially shifted to an output buffer 34 by shift clocks $\phi 1$ and $\phi 2$. In the output buffer 34, photoelectric conversion is performed such that a voltage $\overline{VO}$ corresponding to the stored photoelectric charge and acting as an analog image signal is outputted. Meanwhile, each time photoelectric charge is shifted to the output buffer 34, the output buffer 34 resets the photoelectric charge by a resetting pulse $\phi r$. Although not specifically shown, after wave form and level of this analog image signal have been adjusted by a sample holding circuit and a clamping circuit, the analog image signal is converted by an A-D converter into a digital image signal indicative of gradations of 8 bits having 0 to 255 levels.

Quantity of reflected light from a white portion of the original document to be read changes variously, according to kinds of the original documents, relative to a reference quantity of reflected light from the white portion 28 acting as a reference for adjusting while level. For example, in case the original document is a photograph having low white level, the quantity of reflected light from the white portion of the original document is about 60% of the reference quantity of reflected light from the white portion 28. On the other hand, in case the original document is a printed document having high white level, the quantity of reflected light from the white portion of the original document amounts to about 1.2 times the reference quantity of reflected light from the white portion 28.

The known reader referred to above, the quantity of reflected light from the white portion 28 of the glass plate 21 is fixed as the reference quantity of reflected light and the photoelectric conversion voltage $\overline{VO}$ corresponding to the reference quantity of reflected light is converted by the A-D converter into the digital image signal indicative of full range, i.e. 255 gradations. Therefore, in case the original document is the photograph, the maximum gradation, i.e. the white level does not exceed the 160th gradation and thus, a range of high gradations is not utilized at all. Accordingly, such drawbacks are incurred that dynamic range of image data becomes narrow and S/N ratio deteriorates. On the other hand, the white level of the digital image data read from the printed document reaches as high as the 300th gradation, so that accurate image data cannot be obtained since a portion of high gradations is converted into the 255th gradation.

SUMMARY OF THE INVENTION

Accordingly, an important object of the present invention is to provide a reader in which quantity of electric charge stored in a solid image sensor (CCD sensor) is increased or decreased based on whether white level of an original document is low or high such that accurate digital image data having excellent S/N ratio and wide dynamic range can be obtained.

In order to accomplish this object of the present invention, there is provided a reader embodying the present invention in which quantity of light emitted from a light source to be turned on in response to a lighting signal from a control circuit and reflected by an original document or transmitted through the original document is read by a solid image sensor receiving a clock signal from the control circuit. The signal is converted into an analog signal such that the analog signal is converted by an A-D converter into a digital image signal having a predetermined number of bits. A level adjusting means is used for adjusting a white level of the analog signal to a reference white level, which is provided in the control circuit; the level adjusting means outputting, at the time of adjustment of the reference white level prior to reading of the original document. The clock signal for increasing or decreasing a period for storing electric charge in the solid image sensor such that a value of the analog signal which is read from the original document ought to have the reference white level and is inputted to the A-D converter is converted into a full-range digital image signal by the A-D converter.

Furthermore, the level adjusting means for outputting the clock signal can also be replaced by a level adjusting means which increases or decreases, at the time of adjustment of the reference white level, the duration for activating the lighting signal for the light source such that the value of the analog signal read from the original document ought to have the reference white level and inputted to the A-D converter is converted into the full-range digital image signal by the A-D converter.

At the time of adjustment of the reference white level, height of the white level of the original document ought to have the reference white level changes variously according to kinds of the original documents such as a printed document, a photograph, etc. In accordance with quantity of light reflected by or transmitted through the original document, the level adjusting means in the control circuit outputs to the solid image sensor the clock signal for increasing or decreasing the period for storing electric charge in the solid image sensor, so that the value of the analog signal indicative of quantity of light inputted from the solid image sensor to the A-D converter at the time of adjustment of the reference white level is converted into the full-range digital signal at all times. Therefore, density of the original document at the time of reading of the original document is converted into any one of the full-range gradations uniformly and accurately and thus, it becomes possible to obtain the accurate digital image signal having excellent S/N ratio and wide dynamic range.

Meanwhile, in place of the level adjusting means for outputting the clock signal to the solid image sensor, the level adjusting means may increase or decrease, in accordance with quantity of light reflected by or transmitted through the original document ought to have the reference white level, the duration for activating the lighting signal for the light source such that the value of the analog signal indicative of quantity of light inputted from the solid image sensor to the A-D converter at the time of adjustment of the reference white level is converted into the full-range digital signal at all times. Accordingly, density of the original document at the time of reading of the original document is uniformly and accurately converted into any one of the full-range gradations and thus, the accurate digital image signal having excellent S/N ratio and wide dynamic range can be obtained.

BRIEF DESCRIPTION OF THE DRAWINGS

The objects and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 3:
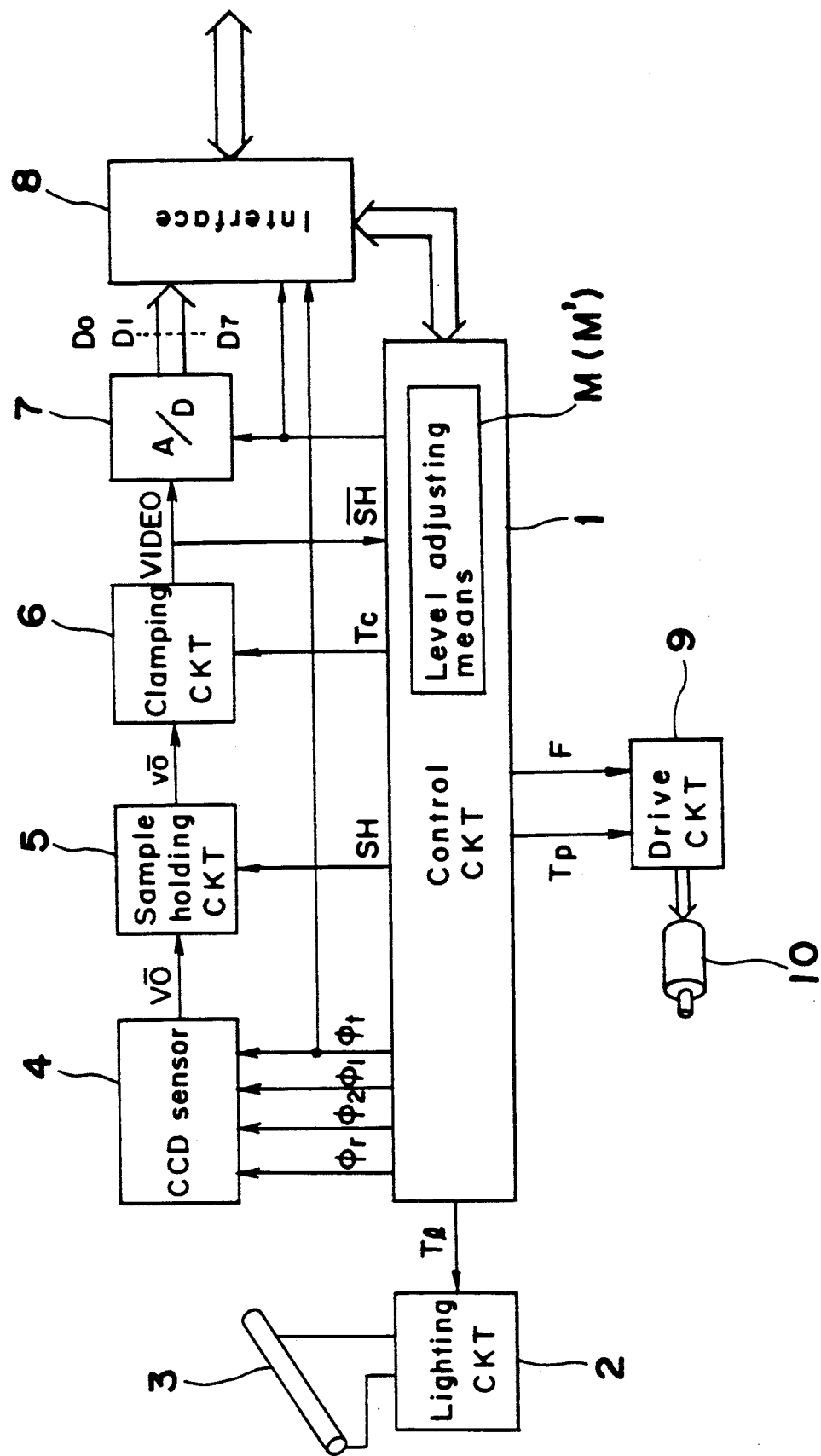
FIG. 3 is a block diagram of a reader according to one embodiment of the present invention.

Referring now to the drawings, there is shown in FIG. 3, a reader according to one embodiment of the present invention. The reader includes a control circuit 1 for controlling various blocks, a lighting circuit 2 for turning on a white fluorescent lamp 3 in response to a lighting signal Tl(="1") from the control circuit 1, a CCD sensor 4 and a sample holding circuit 5. The control circuit 1 has a level adjusting means M for adjusting white level of an analog signal, to be described later.

Figure 1:
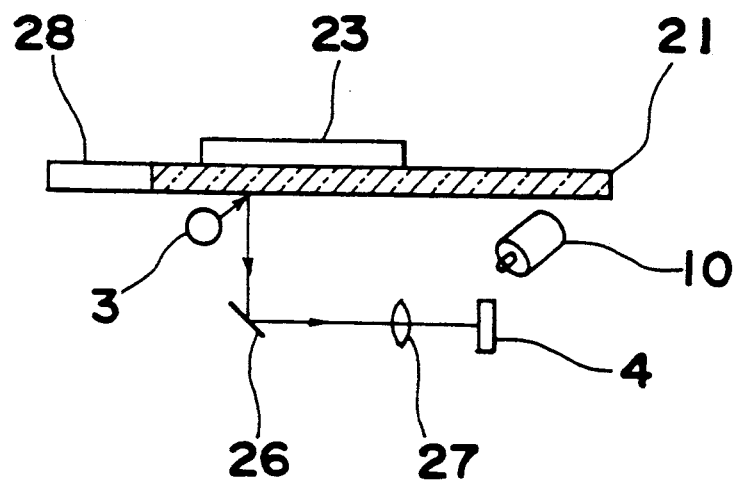
FIG. 1 is a schematic view of a prior art reader (already referred to)

The CCD sensor 4 has a plurality of CCDs. In the CCD sensor 4, quantity of light emitted from the white fluorescent lamp 3 and reflected from an original document 23 (FIG. 1) is converted into an analog voltage signal $\overline{VO}$ on the basis of clock signals $\phi t$, $\phi 1$, $\phi 2$ and $\phi r$ from the control circuit 1. The sample holding circuit 5 performs sample holding of the voltage signal $\overline{VO}$ from the CCD sensor 4 on the basis of a sample holding signal $\overline{SH}$ from the control circuit 1.

The reader further includes a clamping circuit 6, an A-D converter 7, an interface circuit 8 and a drive circuit 9. In the clamping circuit 6, level of a voltage signal $\overline{vo}$ outputted from the sample holding circuit 5 is adjusted on the basis of a clamping signal Tc from the control circuit 1. In the A-D converter 7, an analog signal VIDEO from the clamping circuit 6 is converted into 8-bit digital image signals D0, D1, ---, D7 on the basis of the signal $\overline{SH}$ from the control circuit 1. The interface circuit 8 is provided for connecting the control circuit 1, the A-D converter 7 and a host computer (not shown), while the drive circuit 9 is provided for controlling forward and reverse rotations and angle of rotations of a pulse motor 10 in response to a control signal F and a pulse signal Tp from the control circuit 1, respectively.

Figure 2:
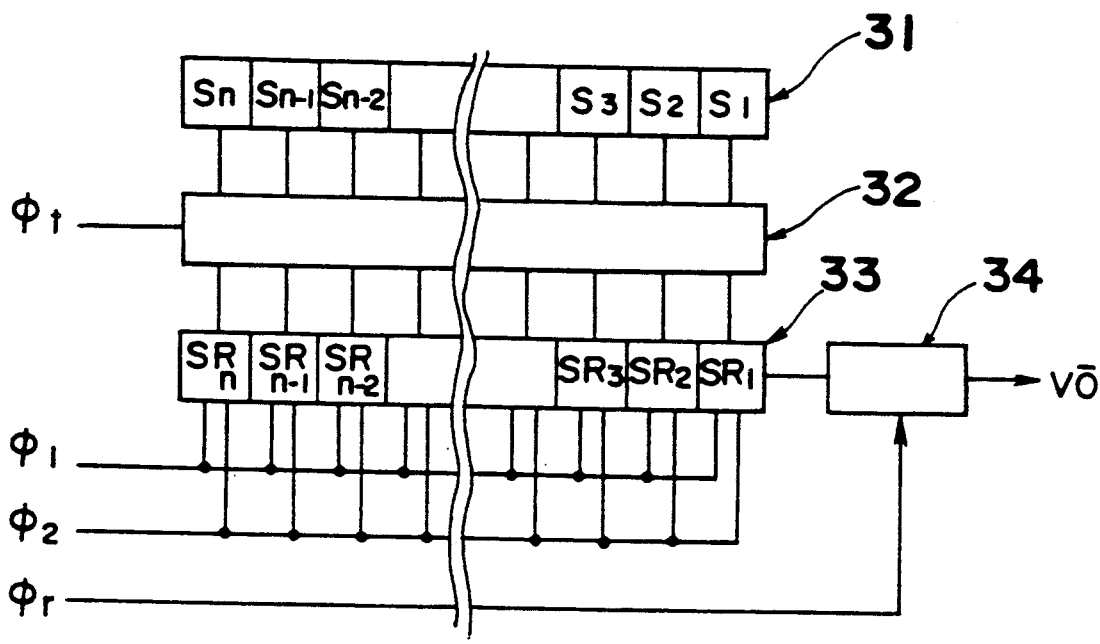
FIG. 2 is a CCD sensor employed in the prior art reader of FIG. 1 (already referred to)
Figure 6:
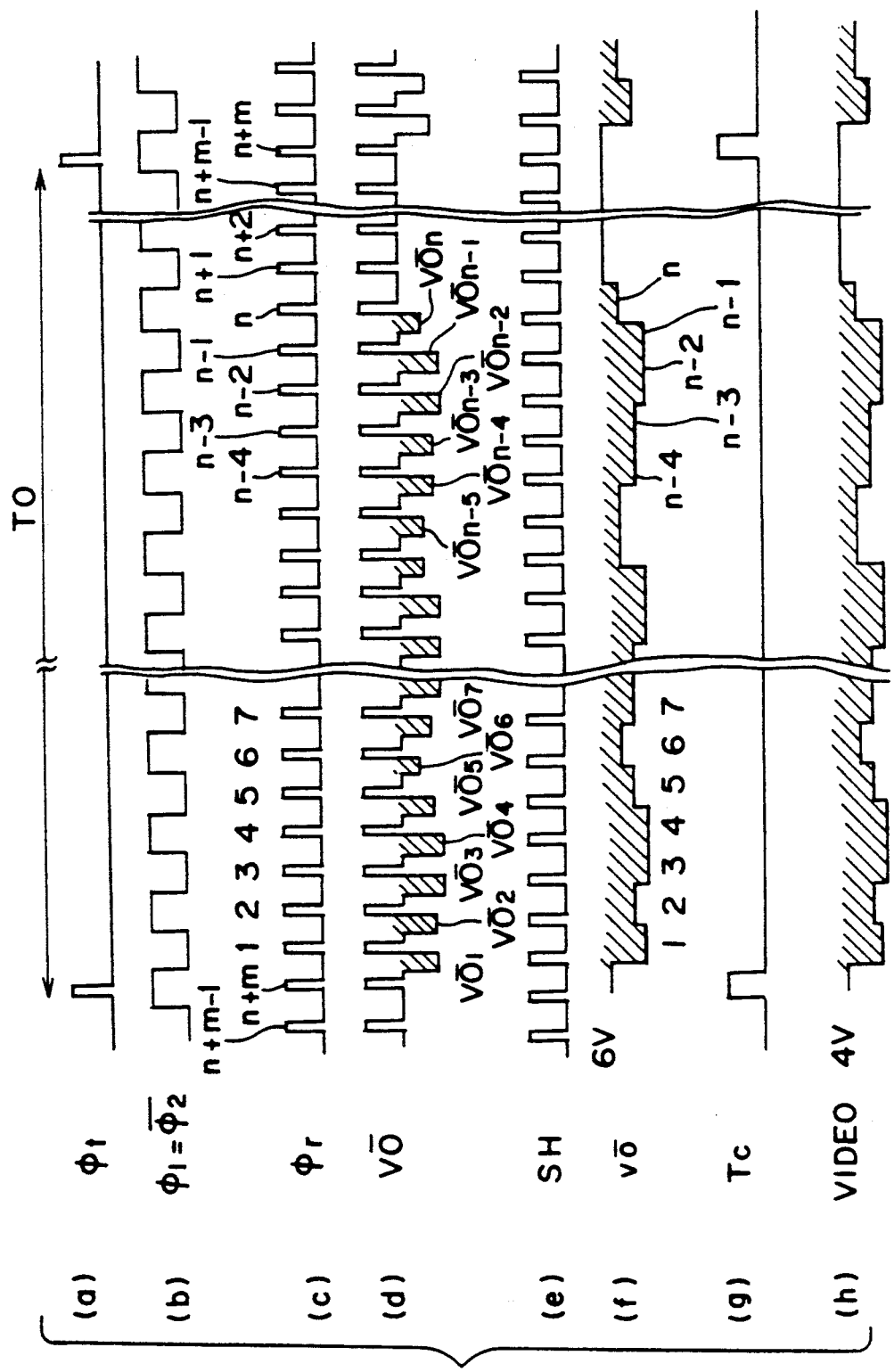
FIG. 6 is a timing chart of signals of the reader of FIG. 3.

The CCD sensor 4 is identical with the known CCD sensor shown in FIG. 2. In the CCD sensor 4, reading period for reading one line is determined by a period T0 of the transfer pulse $\phi t$ to be inputted as shown in FIG. 6(a). Supposing that characters n and m denote natural numbers, period for storing electric charge in each of the CCDs is determined by the clock signals $\phi 1$ and $\phi 2$ dividing this reading time by (n+m) as shown in FIG. 6(b). Synchronously with the resetting pulse $\phi r$ (FIG. 6(c)) having double frequency of the clock signals, the CCD sensor 4 serially transfers electric charge stored in the CCDs in accordance with density of the original document and outputs n voltage signals $\overline{VO}$ corresponding to the electric charge as shown in FIG. 6(d).

Figure 4:
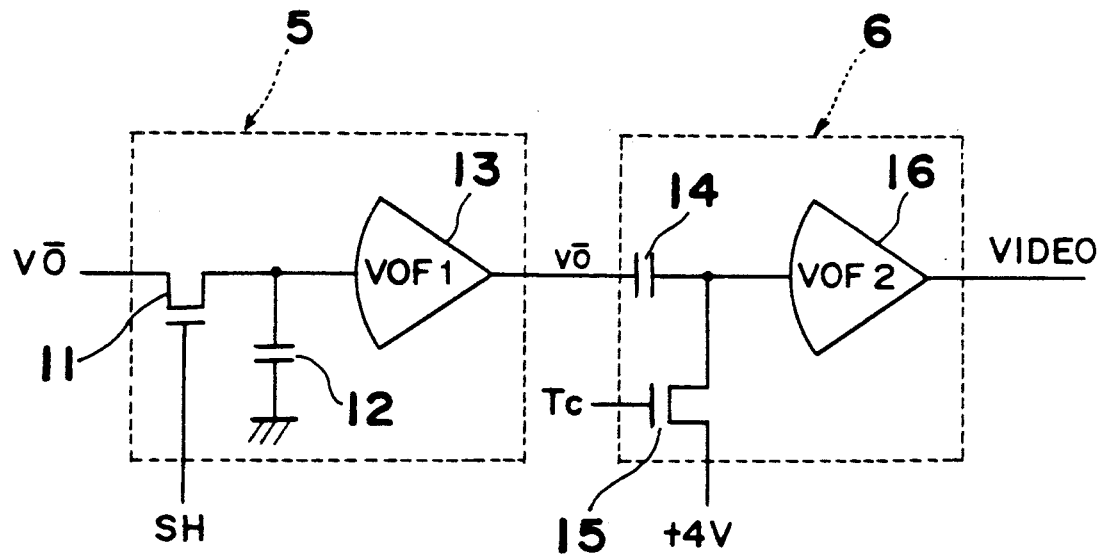
FIG. 4 is a circuit diagram showing a portion of the reader of FIG. 3.

As shown in FIG. 4, the sample holding circuit 5 is constituted by an analog switch 11, a capacitor 12 for storing the voltage signal $\overline{VO}$ via the capacitor 12 and a voltage follower 13 for outputting voltage of the capacitor 12. The analog switch 11 is electrically conducted by the sample holding signal $\overline{SH}$ (FIG. 6(e)). The sample holding circuit 5 outputs the voltage signal $\overline{vo}$ shown in FIG. 6(f) to the subsequent clamping circuit 6. Meanwhile, the clamping circuit 6 is constituted by a coupling capacitor 14, an analog switch 15 and a voltage follower 16. The analog switch 15 is disposed subsequently to the coupling capacitor 14 and is electrically conducted by the clamping signal Tc (FIG. 6(g)) so as to apply a fixed voltage of +4 V. The voltage follower 16 is provided for outputting the fixed voltage. As shown in FIGS. 6(h), the clamping circuit 6 shifts black level of the inputted voltage signal $\overline{vo}$ from 6 V to 4 V downwardly so as to output the analog signal VIDEO.

Figure 7A:
FIGS. 7a 7b and 7c are views showing analog signals inputted to an A-D converter employed in the reader of FIG. 3.
Figure 7B:
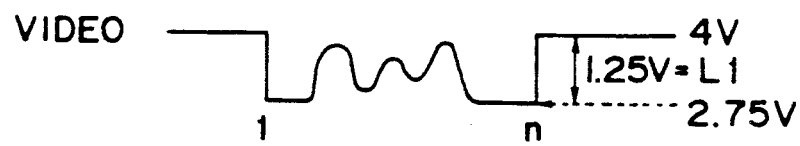
Figure 7C:
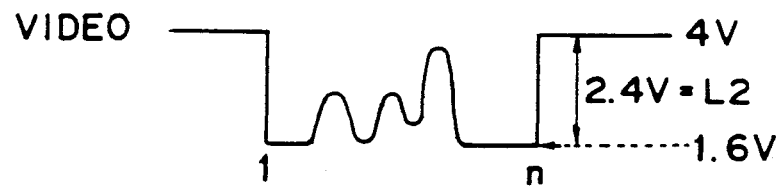

The analog signal VIDEO outputted from the clamping circuit 6 has a wave form shown in FIG. 7a in the case where the CCD sensor 4 receives reflected light from a white portion 28 (FIG. 1) of a glass plate 21 having the original document placed thereon. At this time, all signals from the n CCDs have a reference white level of 2 V lower than the black level of 4 V by 2 V (=LO). Synchronously with rise edge of the signal $\overline{SH}$, the A-D converter 7 converts the n reference white levels into the full-range 8-bit digital image signals D7, ---, D0 (=$FF_H$). Meanwhile, the white level of the analog signal VIDEO varies greatly according to degree of white of the original document. Thus, as shown in FIG. 7b, in case the original document is a photograph having low degree of white, the white level of the analog signal VIDEO assumes 2.75 V which is merely 1.25 V (=L1) lower than the black level of 4 V. On the contrary, as shown in FIG. 7c, in case the original document is a printed document having high degree of white, the white level of the analog signal VIDEO assumes 1.6 V which is 2.4 V (=L2) lower than the black level of 4 V. Hence, in order to compensate this variation of the white level of the analog signal such that the white level of any original document is adjusted to the reference white level of 2 V, the level adjusting means M for adjusting white level of the analog signal is provided in the control circuit 1.

Figure 8A:
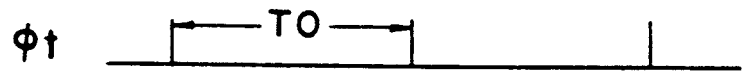
FIGS. 8a 8b and 8c are views showing adjustment by a level adjusting means, of period for reading one line in the reader of FIG. 3.
Figure 8B:
Figure 8C:
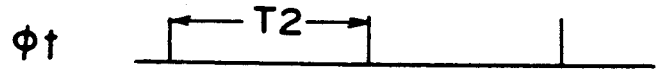

Prior to reading of the original document, the above mentioned level adjusting means M detects the white level L1 or L2 of the analog signal VIDEO on the basis of the analog signal VIDEO produced by reflected light from the white portion of the original document. The reference white level L0 is divided by the detected value of the level adjusting means M and result of division, i.e. L0/L1 or L0/L2 is multiplied by the reference reading period T0 (FIG. 8a) for reading one line so as to be set as a reading period T1 or T2 for reading one line as shown in FIGS. 8b and 8c. The transfer pulse $\phi$t having the period T1 or T2 is outputted to the CCD sensor 4 so as to start reading of the original document. Therefore, in the case where the original document has low degree of white, i.e. L1<L0, the period T1 becomes longer than the period T0 and thus, the period for storing electric charge in each of the CCDs is increased. On the other hand, in the case where the original document has high degree of white, i.e. L2>L0, the period T2 becomes shorter than the period T0 and thus, the period for storing electric charge in each of the CCDs is reduced. As a result, the analog signal VIDEO inputted to the A-D converter 7 assumes the reference white level L0 of 2 V corresponding to the full-range image signal $FF_H$ at all times, regardless of kinds of the original document. Namely, density of the original document is at all times converted uniformly and accurately into gradation expressed by any one of codes of 8 bits.

The drive circuit 9 rotates the pulse motor 10 forwardly and reversely in response to a control signal F of "1" or "0", respectively so as to displace the glass plate 21 (FIG. 1) through ⅛ mm each time one pulse signal Tp is applied to the drive circuit 9.

Hereinbelow, operation of the reader of the above described arrangement is described. In response to an analog signal VIDEO from the clamping circuit 6, which is produced by reflected light from the white portion 28 (FIG. 1) of the glass plate 21 having an original document placed thereon, the level adjusting means M of the control circuit 1 initially detects and stores the reference white level L0=2 V (FIG. 7a) of the analog signal VIDEO. Then, prior to reading of the original document, the level adjusting means M receives an analog signal VIDEO produced by reflected light from a white portion of the original document so as to detect a white level L1 or L2 of the analog signal VIDEO. Subsequently, the level detecting means divides the reference white level L0 by the detected value L1 or L2 and multiplies the quotient L0/L1 or L0/L2 by the reference reading period T0 for reading one line so as to output to the CCD sensor 4 the transfer pulse $\phi$t having the product as the period T1 (=T0×L0/L1) or T2 (=T0×L0/L2) such that reading of the original document is started.

Therefore, the white level of the analog signal VIDEO inputted to the A-D converter 7 at the time of reading of the original document is compensated to the reference white level L0 corresponding to the full-range $FF_H$ regardless of height of degree of white of the original document as described above. Thus, since the density of the original document is at all times converted uniformly and accurately into any one of 0 to 255 gradations expressed by the 8-bit code, it becomes possible to obtain an accurate digital image signal having excellent S/N ratio and wide dynamic range.

Figure 9A:
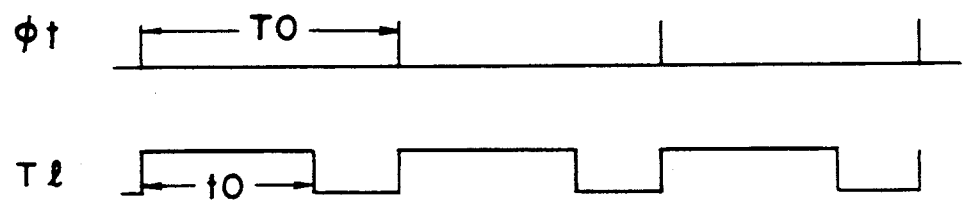
FIGS. 9a 9b and 9c are views showing operation of a modification of the level adjusting means of FIGS. 8a to 8c.
Figure 9B:
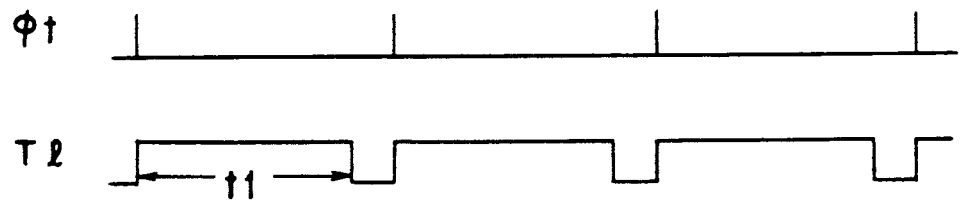
Figure 9C:
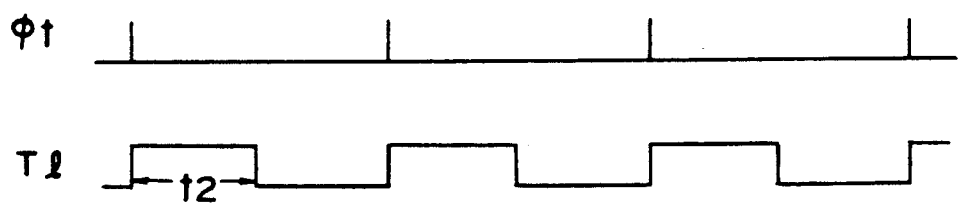

FIGS. 9a to 9c show operation of a level adjusting means M' (FIG. 3) provided in the control circuit 1, which is a modification of the level adjusting means M. In this level adjusting means M', the white fluorescent lamp 3 is not held in the ON state at all times as shown in FIG. 9a but is held in the ON state only for a reference lighting period t0 in the reference reading period T0 for reading one line and the white level of the analog signal VIDEO produced by reflected light from the white portion 28 of the glass plate 21 assumes the reference white level L0 of 2 V at this time. In this respect, this modification is different from the above embodiment. In the same manner as the above embodiment, the level adjusting means M' detects the white level L1 or L2 of the analog signal VIDEO produced by reflected light from the white portion of the original document so as to obtain the quotient L0/L1 or L0/L2. Then, the level adjusting means M' multiplies the quotient L0/L1 or L0/L2 by the reference lighting period t0 so as to obtain a lighting period t1 (=t0×L0/L1) or t2 (=t0xL0/L2) such that the lighting signal Tl (="1") is outputted to the lighting circuit 2 only for the lighting period t1 or t2. Namely, without changing the period T0 of the transfer pulse $\phi$t, the lighting period of the white fluorescent lamp 3 is increased or decreased as shown in FIGS. 9b and 9c such that the white level of the original document is compensated to the reference white level L0. Therefore, also in this modification, density of the original document obtained at the time of reading of the original document is at all times converted uniformly and accurately into any one of 0 to 255 gradations expressed by the 8-bit code and an accurate digital image signal having excellent S/N ratio and wide dynamic range can be obtained.

Figure 5:
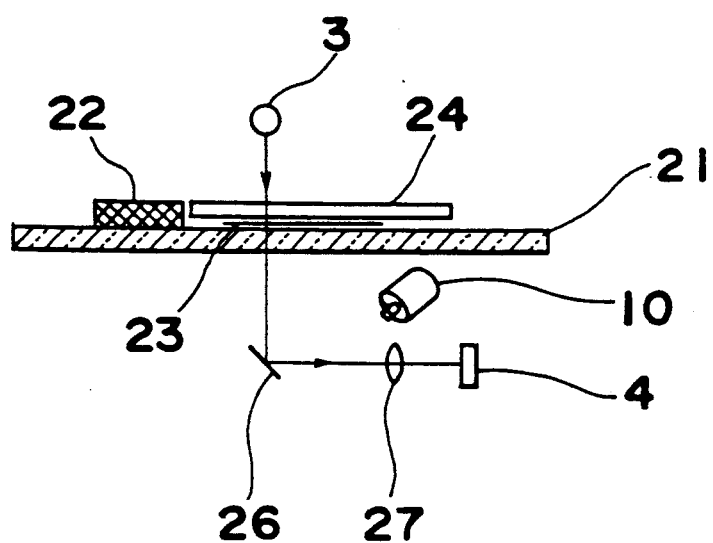
FIG. 5 is a schematic view of the reader of transmission type of FIG. 3.

FIG. 5 shows a reader of transmission type, according to the present invention. In this reader of transmission type, quantity of light transmitted through the original document is read. In this reader of transmission type, a film 23 acting as the original document is placed on a glass plate 21 having a reference diffusion plate 22 placed on its distal end portion such that the film 23 is covered by a diffusion plate 24. At one side of the glass plate 21 adjacent to the diffusion plate 24, the white fluorescent lamp 3 is provided. Meanwhile, at the other side of the glass plate 21 remote from the diffusion plate 24, a mirror 26, a lens 27 and the CCD sensor 4 are provided such that the glass plate 21 is reciprocated by the pulse motor 10. In the above described embodiment, the reader of reflection type has been described but, needless to say, the present invention is applicable to such reader of transmission type.

In the above mentioned embodiment, the level adjusting means automatically performs division on the basis of the analog signal VIDEO so as to obtain the proper adjustment coefficient L0/L1 or L0/L2. However, it can also be so arranged that this adjustment coefficient is outputted from the host computer through the interface circuit 8.

As is clear from the foregoing description, in the reader of the present invention, quantity of light which is emitted from the light source to be turned on by the lighting signal and is reflected by or transmitted through the original document is read by the solid image sensor so as to be converted into the analog signal. Then, the analog signal is converted into the digital image signal of the predetermined number of bits by the A-D converter. The clock signal for increasing or decreasing period for storing electric charge in the solid image sensor is applied to the solid image sensor by the level adjusting means provided in the control circuit such that at the time of adjustment of the reference white level, either value of the analog digital signal read from the original document ought to have the reference white level is converted into the full-range digital signal or duration for activating the lighting signal for the light source is increased or decreased.

Accordingly, in accordance with the present invention, the white level of the analog signal at the time of reading of the original document is at all times compensated to the reference white level corresponding to the full-range digital signal, regardless of height of degree of white of the original document.

Furthermore, in accordance with the present invention, density of the original document is uniformly and accurately converted into any one of the gradations of the predetermined number of bits and it becomes possible to obtain an accurate digital image signal having excellent S/N ratio and wide dynamic range.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. In a reader in which a quantity of light emitted from a light source can be turned on in response to a lighting signal from a control circuit and the light can be reflected by an original document or transmitted through the original document for reading by a solid image sensor receiving a clock signals from said control circuit so as to be converted into an analog signal and that analog signal is convertible by an A-D converter into a digital image signal having a predetermined number of bits, the improvement comprising:

the control circuit including a level adjusting means for adjusting a while level of the analog signal to a reference white level, prior to a reading of the original document, by detecting a white level of an analog signal produced by light from the original document and comparing the detected white level to a reference white level;

said level adjusting means outputting, prior to reading the original document, the clock signal for increasing or decreasing a period for storing electric charge in said solid image sensor so that a value of the analog signal which is read from the original document will have the reference white level and will be inputted to said A-D converter to be converted into a full-range digital image signal by said A-D converter, independent of the density of the original document;

2. In a reader in which a quantity of light emitted from a light source can be turned on in response to a lighting signal from a control circuit and the light can be reflected by or transmitted through the original document for reading by a solid image sensor receiving a clock signal from said control circuit so as to be converted into an analog signal such that the analog signal is convertible by an A-D converter into a digital image signal having a predetermined number of bits, the improvement comprising:

the control circuit including a level adjusting means for adjusting a white level of the analog signal to a reference white level prior to a reading of the original document by detecting a white level of an analog signal produced by light from the original document and comparing the detected while level to a reference white level;

said level adjusting means increasing or decreasing a duration for activating the light signal for said light source such that a value of the analog signal which is read from the original document will have the reference white level when inputted to said A-D converter is convertible into the full-range digital image signal by said A-D converter, independent of the density of the original document.

3. A reader for reading reflected or transmitted light from an original document in order to convert a read signal into a digital image signal comprising:

a light source for emitting a quantity of light, operatively connecting to a control circuit for actuating the light source;

a solid image sensor for receiving reflected or transmitted light from the original document, operatively connected to said control circuit so as to receive clock signals from said control circuit;

an A-D converter operatively connected to the solid image sensor to convert an analog signal having a predetermined number of bits;

said control circuit including level adjustment means for detecting prior to reading the original document, a white level of an analog signal produced by light from the original document and comparing the detected white level with a reference white level so that the analog signal is connected into a full-range digital image signal at all times, independent of the density of the original document.

4. The apparatus of claim 3 wherein, said adjusting level means outputs prior to reading the original document, the clock signals for varying a period for storing an electrical charge in said image sensor so that a value of an analog signal to be read from the original document will have the reference white level to be inputted into said A-D converter to be converted into a full-range digital image signal by said A-D converter.

5. The apparatus of claim 4 wherein the period for storing the electrical charge is increased when the detected white level is lower than the reference white level.

6. The apparatus of claim 4 wherein the period of storing the electrical charge is decreased when the white level is higher than the reference white level.

7. The apparatus of claim 3 wherein the level adjustment varies the quantity of light from said light source by varying a lighting signal in response to the comparing.

8. A method of adjusting a white level of an analog signal from an original document prior to the reading of the document by a reader, the reader including a control circuit for a light source, a solid image sensor which can receive clock signals from the control circuit and an A-D converter for converting an analog signal into a digital image signal comprising the steps before reading the original document of:
   (a) using a level adjustment means for within the control circuit to detect a white level of an analog signal produced by reflected light from the original document;
   (c) converting, by the use of the level adjustment means, the analog signal means into a full range digital image signal independent of the density of the original document.

9. The method of claim 8 further comprising the step of;
   (d) outputting clock signals for varying a period for storing electrical charge in said solid image sensor so that an analog signal read from the original document will have the same value as the reference white level.

10. The method of claim 9 wherein the period for storing is increased when the detected white level is lower than the reference white level.

11. The method of claim 9 wherein the period for storing is decreased when the detected white level is higher than the reference white level.

12. The method of claim 8 wherein the comparison is done by dividing the reference value by the detected value and thereafter multiplying by a value of a reading period.

13. The method of claim 8 wherein a quantity of light from the light source is varied in response to step (b).

14. The method of claim 13 wherein the step of comparing includes dividing the reference value by a detected value and multiplying the result by a reference lighting period.

* * * * *